(12) United States Patent
Thelen et al.

(10) Patent No.: US 12,115,841 B2
(45) Date of Patent: Oct. 15, 2024

(54) GROUND MILLING MACHINE

(71) Applicant: BOMAG GMBH, Boppard (DE)

(72) Inventors: Thomas Thelen, Boppard (DE); Felix Franzen, Boppard (DE); Sonja Schneider, Boppard (DE); Jeton Kelmendi, Boppard (DE)

(73) Assignee: BOMAG GMBH, Boppard (DE)

( * ) Notice: Subject to any disclaimer, the term of this patent is extended or adjusted under 35 U.S.C. 154(b) by 120 days.

(21) Appl. No.: 17/657,967

(22) Filed: Apr. 5, 2022

(65) Prior Publication Data

US 2022/0314751 A1 Oct. 6, 2022

(30) Foreign Application Priority Data

Apr. 6, 2021 (DE) ..................... 10 2021 001 752.8
Jul. 20, 2021 (DE) ..................... 10 2021 118 663.3

(51) Int. Cl.
| | | |
|---|---|---|
| *B60J 1/16* | (2006.01) | |
| *B60J 1/06* | (2006.01) | |
| *B60J 7/02* | (2006.01) | |
| *B60J 7/04* | (2006.01) | |
| *B60J 10/77* | (2016.01) | |
| *B62D 33/063* | (2006.01) | |
| *E01C 23/088* | (2006.01) | |

(52) U.S. Cl.
CPC ................ *B60J 1/06* (2013.01); *B60J 7/022* (2013.01); *B60J 7/041* (2013.01); *B60J 10/77* (2016.02); *B62D 33/0633* (2013.01); *E01C 23/088* (2013.01)

(58) Field of Classification Search
CPC ...... E01C 2301/30; E01C 23/088; B60J 1/06; B60J 10/77; B60J 7/022; B60J 7/041; B62D 33/0633; B62D 33/06; B66C 13/54; B63B 19/02
See application file for complete search history.

(56) References Cited

U.S. PATENT DOCUMENTS

| | | |
|---|---|---|
| 3,964,779 A | 6/1976 | Benson |
| 5,473,840 A | 12/1995 | Gillen et al. |
| 8,950,803 B2 | 2/2015 | Herzberg et al. |
| 10,246,164 B1 | 4/2019 | Flota |

(Continued)

FOREIGN PATENT DOCUMENTS

| | | |
|---|---|---|
| CN | 201560677 | 8/2010 |
| CN | 203256572 | 10/2013 |

(Continued)

OTHER PUBLICATIONS

Partial English translation of Office Action from related Chinese Appln. No. 202210353181.0, dated Aug. 10, 2023.

(Continued)

*Primary Examiner* — Carib A Oquendo
(74) *Attorney, Agent, or Firm* — Grossman, Tucker, Perreault & Pfleger, PLLC

(57) ABSTRACT

A ground milling machine comprising a machine frame, a driver's cab, a drive motor, movement means driven by the drive motor and a milling unit for milling up ground material, wherein the driver's cab has a protection roof and a front window device through which an operator located in the driver's cab can look forward in a forward direction of the ground milling machine.

17 Claims, 5 Drawing Sheets

(56) References Cited

U.S. PATENT DOCUMENTS

2014/0035344 A1 2/2014 Huhn
2015/0102637 A1 4/2015 Lemke et al.
2015/0367897 A1 12/2015 Gillard et al.
2019/0161131 A1 5/2019 Barimani et al.

FOREIGN PATENT DOCUMENTS

| CN | 107264650 | | 10/2017 |
|----|-----------|---|---------|
| DE | 69534060 | | 4/2006 |
| DE | 102011105556 | | 12/2012 |
| DE | 202013006878 | | 10/2013 |
| DE | 102017221053 | | 5/2019 |
| FR | 2285498 | | 4/1976 |
| JP | 2004324101 | * | 11/2004 |

OTHER PUBLICATIONS

Office Action from related Chinese Appln. No. 202210353181.0, dated Apr. 8, 2024. English translation attached.

* cited by examiner

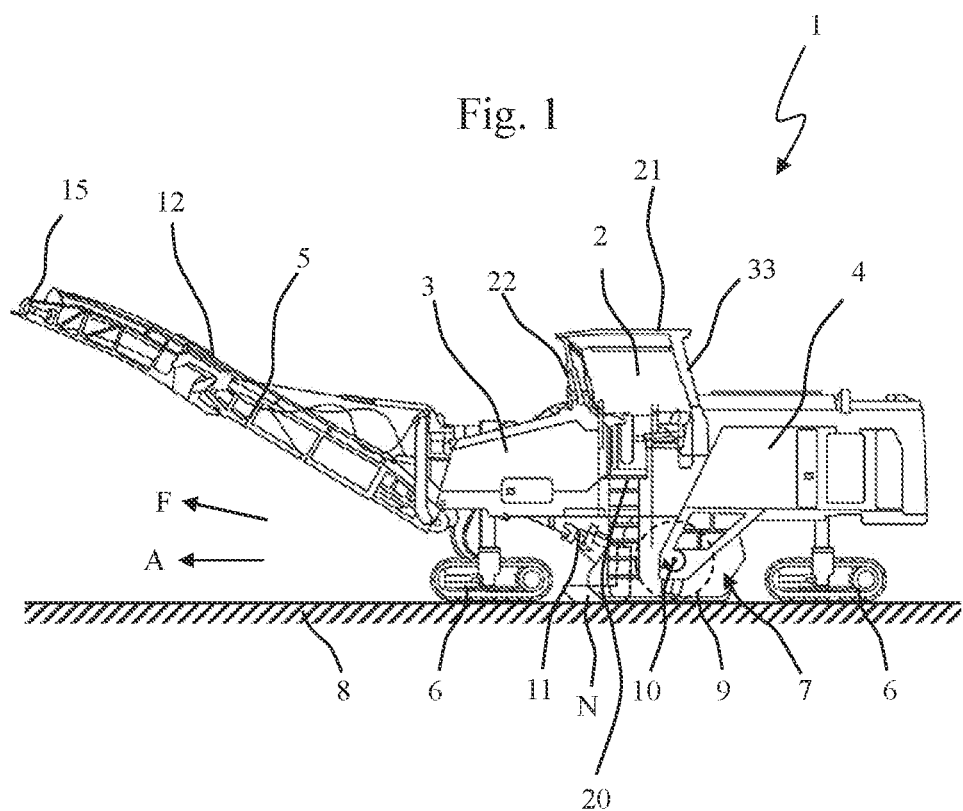

GROUND MILLING MACHINE

FIELD

The invention relates to a ground milling machine.

BACKGROUND

Ground milling machines of the type in question, in particular cold road milling machines, comprise a machine frame forming the fundamental support structure of the ground milling machine, a driver's cab, a drive motor, typically a diesel combustion engine, movement means driven by the drive motor, and a milling unit for milling up ground material. The milling unit usually comprises a milling drum rotatable horizontally and transversely to the direction of work and a milling drum box that is open towards the ground and in the interior of which there is arranged the milling drum. Ground milling machines of the rear-rotor type are known, in which the milling unit, viewed in the forward direction of the ground milling machine, is arranged at the height between two rear movement means. Alternatively, so-called center-rotor-type milling machines are known, in which the milling unit, seen in the forward direction, is arranged between front and rear movement means, in each case at a distance therefrom. Such ground milling machines are regularly used in road and path construction for milling or breaking up ground material, for example for removing a road layer at a desired milling depth. During operation, the milled ground material collects in the milling drum box and often has to be removed. For this purpose, such a ground milling machine can have a conveying device that transports the milled-up ground material, i.e. the milled material, from the milling unit in the milling drum box to a discharge point of the ground milling machine. At the discharge point of the conveying device, the milled material leaves the conveying device, for example to be dropped into a loading trough of a transport vehicle and transported away. The conveying device can comprise two conveying belts arranged in series one behind the other, specifically a first transfer conveyor belt and a loading conveyor belt arranged downstream in the conveying direction.

The ground milling machine is operated by an operator located in the driver's cab. The driver's cab is typically arranged vertically above the milling unit. Control devices, such as input elements arranged on control panels, can be arranged in the driver's cab, via which control devices the operator can enter manual control commands. The driver's cab comprises a driver's cab floor that is usually at least substantially (i.e. also in the case of a spring-mounted driver's cab) stationary relative to the machine frame and defines the driver's standing area within the driver's cab. In addition to the floor of the driver's cab, the driver's cab can have driver's cab floor widening elements which are laterally displaceable and/or which can be pivoted out. It is also known to equip the driver's cab with a protection roof and a front window device with a one-piece front window, as disclosed for example in DE102017221053A1, through which an operator located on the driver's cab can look forward in a forward direction of the ground milling machine. Such an arrangement can, in particular, provide weather protection for the operator located in the driver's cab. For such ground milling machines, it is known that the driver's cab superstructure with protection roof and front window device can be adjusted, for example pivoted, from an operating position projecting in the vertical direction into a stowed position which is smaller in comparison in the vertical direction. This facilitates the transport of the ground milling machine. For the protection roof, protection roof elements that can be extended out to the side or an adjustability of said protection roof elements in the horizontal plane and transversely to the forward direction of the ground milling machine can be provided. A linear displaceability of the front window is also known. The driver's cab floor widening elements can allow the operator to create optimized visibility conditions for milling work, as they allow him to look sideways along the machine in the forward direction of the ground milling machine. This allows precise guidance of the ground milling machine during the milling process. The extendable protection roof elements as well as a laterally adjustable front window arrangement make it possible to adapt the weather protection to a lateral operating position for the operator. However, practical use shows that the measures known so far are not yet optimal and are perceived by the operator to be uncomfortable at least in part.

SUMMARY

The object of the invention is therefore to provide a way of further increasing the ease of use for an operator located in the driver's cab.

The object is achieved with a ground milling machine according to the independent claim. Advantageous embodiments are described in the dependent claims.

If no further details are given below, reference is made to a driver's cab in the operating position, i.e. in particular with the protection roof raised. In the case of existing driver's cab floor widening elements, reference is made to their retracted or restricted position and thus their position not widening the driver's cab floor, unless a different positioning is explicitly referred to in the specific context. The forward direction of the ground milling machine indicates the main direction of movement of the ground milling machine during milling operations. The front window is accordingly arranged on the driver's cab in such a way that an operator in the driver's cab can see through the front window in the forward direction of the ground milling machine.

Essential elements of a ground milling machine of the type in question are thus the machine frame, the driver's cab, the drive motor, the movement means driven by the drive motor, which can be connected to the machine frame in particular via lifting devices, and the milling unit for milling up ground material. It is further provided that the driver's cab comprises a protection roof and a front window device through which an operator located in the driver's cab can look forward in a forward direction of the ground milling machine. According to the invention, the front window device is constructed in such a way that it comprises at least two front windows which are adjustable relative to one another in an operating position of the driver's cab. The fact that there is now not just one single large solid front window, but at least two front windows that can be adjusted relative to each other, results in a considerably greater range of variation for the operator to adjust the front window position and also the total area of the two front windows in the forward direction towards the front. In particular, as described in more detail below, it is possible to increase the width running horizontally and transversely to the forward direction and thus the total area covered by the front window arrangement, starting from a zero position in which the width of the front window arrangement corresponds, for example, substantially to the width of the driver's cab in the operating position (and thus there is also an exit area), preferably independently of adjustment movements of the protection roof and/or driver's cab floor widening elements. Thus, the width of the front window arrangement can even be significantly larger than the width of the driver's cab. This can be of great advantage especially in adverse weather conditions.

In this context, it is further preferred, in order to improve the safety conditions, if the two front windows are frameless, at least on their respective outer sides, to the right and/or left. In this way, it is prevented that such a lateral frame element is potentially in the field of vision of the operator. In the vertical direction above and/or below, supporting devices, guiding devices and/or sealing devices can also preferably be arranged on the two front windows, which are preferably at least partially in contact with them.

The two front windows can be identical in construction. In particular, it can be advantageous in particular to install the windows rotated in relation to each other, i.e. rotated 180° in relation to each other about a vertical axis.

The at least two front windows are adjustable relative to each other along a, in particular common, linear longitudinal axis, running horizontally and transversely to the forward direction of the ground milling machine. Preferably, the at least two front windows are displaceable along a common thrust axis or are structurally displaceable along a common guide device. Such a guide device is designed in particular for linear displaceability, specifically in the horizontal direction transverse to the forward direction, of the two front windows along a longitudinal axis. This can be a rail guide, for example, one or more longitudinally extended guide beams or the like.

It is ideal if the guide device is not only designed for lateral adjustment guidance of the two front windows, but is at the same time a pivot shaft, in particular continuous from the right to the left side of the ground milling machine, around which the relative position of the two front windows to a protection roof shell or a protection roof frame is displaceable, in particular between an operating and working position, in which the protection roof is raised relative to the rest of the machine, and a transport position, in which the protection roof is lowered relative to the rest of the machine, for example swung down towards the front or rear region of the machine, in order to reduce the overall height of the machine. In the transport position, the front windows are thus preferably pivoted under the protection roof. In this case, the guide device thus fulfils a dual function, namely a guiding function on the one hand and a pivoting function on the other.

It can thus be provided that the guide device, via which the adjustment of the at least two front windows in relation to each other is made possible, in preferably axial extension is part of a pivot joint, with which the aforementioned protection roof adjustment is made possible. It is ideal if both front windows are displaceably mounted on a common pivot shaft. In other words, both front windows are preferably mounted in such a way that they have a common pivot and thrust axis.

It is optimal if the two front windows are each mounted on the pivot shaft via a plain bush that surrounds the pivot shaft, although other types of guides, in particular rail guides, are also possible.

It is preferred if the front windows, which can be adjusted relative to the rest of the machine, are mounted, in particular on the guide device, in suspended fashion. It is therefore advantageous if the bearing for lateral adjustment of the front windows is a bearing via which the front windows are also simultaneously suspended from the respective guide devices. This means that the guide device thus supports both front windows. For this purpose, it can be provided in particular that the connection of the adjustable front windows to the respective guide devices is provided on the side of the latter that is located at the top in the vertical direction. In the vertical direction below, on the other hand, it may already be sufficient that only a type of sealing and/or pivot limitation is realized here, whereby a guiding effect is obtained for the adjustable front windows, but no supporting function is provided.

It is possible that the front windows can be adjusted laterally relative to each other manually, for example by an operator manually sliding the front window to be adjusted along a linear guide, such as described above. However, it can also be provided that at least one of the adjustable front windows, and in particular all adjustable front windows, can be adjusted by a motor. This can further increase the ease of use. For this purpose, a suitable adjustment gear can also be provided, via which the motor-generated drive movement is converted into an adjustment movement of one or more of the front windows. The adjustment gear can be self-locking here in particular, in order to simultaneously stabilize the position of the adjusted front window in the current adjustment position. The drive motor can be an electric motor, for example. A common electric motor can be provided for a plurality of front windows or one electric motor can be provided for each adjustable front window.

Furthermore, a releasable locking device can be provided, which is designed to lock the adjustable front windows in one or more adjustment positions. This can, for example, enable a continuous fixing, an end position fixing or also a stepped fixing. For example, releasable locking devices acting by frictional engagement and/or interlocking engagement, for example comprising a clamping roller and/or a locking pin, can be suitable here. Magnetically acting locking devices are also possible.

It has already been mentioned above that the protection roof can be adjusted, in particular pivoted, together with the front windows between an operating and working position and a transport position. This adjustment movement can also be driven by means of a drive motor. Electric motor or hydraulic drive concepts can preferably be used here.

In a preferred embodiment, the ground milling machine comprises at least one sensor via which at least one adjustment position of at least one front window can be determined. The sensor can be designed here in such a way that it is only designed to identify a specific adjustment position of the at least one front window, for example "maximally pushed in" or "maximally pushed out". Additionally or alternatively, the sensor can also be designed in such a way that it detects whether the front window is just inside and/or outside a defined adjustment range, in other words, whether it is inside or outside an adjustment path threshold. Lastly, it can also be provided that the sensor detects the specific position of the at least one front window within an adjustment range. The determined sensor data can be transmitted to a control unit to enable further functionalities. For example, it can thus be ensured that the adjustable front windows do not protrude to the side beyond the protection roof outer edges when the protection roof is folded into the transport position and/or, for example, lie within lateral protection roof overhangs that protect the front windows during transport. The control unit can thus be designed in such a way that, before moving the protection roof from the operating position to the transport position, it checks whether the front windows are in a relative position in relation to the protection roof suitable for adjustment into the transport position. If this is not the case, it can be provided that an adjustment of the protection roof into the transport position is prevented or not released and/or this is signaled to the operator, for example by an optical and/or acoustic signal.

There are also various possibilities with regard to the relative arrangement of the at least two front windows as seen in the forward direction. It can be advantageous if the at least two front windows are arranged one behind the other in the forward direction of the ground milling machine. This allows them to be brought into an overlapping position when viewed in the forward direction. The width of the at least two front windows is preferably selected in such a way that, in a position in which they extend in their entirety exactly over the width of the (not widened with widening elements) driver's cab (i.e. horizontally and transversely to the forward direction), they overlap by at least 40%, particularly preferably by at least 60% and ideally by at least 70% of their respective widths. Alternatively, it is also possible that the at least two front windows are arranged next to each other as seen in the forward direction of the ground milling machine, wherein they cannot be pushed over each other.

In such an arrangement of the two front windows in the forward direction "one behind the other", these are preferably arranged in such a way that an intermediate free space is obtained between the two front windows. For example, a cleaning device, such as a brush, and/or a sealing device can be arranged in this space. Preferably, however, this free space is chosen to be large enough, for example greater than 1 cm in circumference, so that air can flow comparatively well therein and thereby, for example, dust deposits are reduced. Additionally or alternatively, a blower device can also be provided, with the help of which an air flow can be selectively introduced in this intermediate space and/or a cleaning device with water can be used.

In principle, it can be advantageous if at least one of the at least two front windows has a width that corresponds to the maximum width of the ground milling machine and/or the driver's cab (or the driver's cab without widening elements) or is smaller, in particular smaller than 90%, very particularly smaller than 80% of the maximum ground milling machine and/or driver's cab. Additionally or alternatively, the width of one of the at least two front windows can be designed in such a way that it corresponds to at least a width of 40%, in particular at least a width of 50% and very particularly at least a width of 60% of the maximum width of the ground milling machine and/or the width of the driver's cab floor.

The at least two front windows can be adjusted between a transport position and an extended position relative to the rest of the driver's cab (in particular in its operating position), wherein the maximum possible width ("maximum width") of the front window device (i.e. of the at least two front windows together) with regard to the adjustment range, in the extended position, is preferably greater than the minimum possible adjustment width ("minimum width") of the front window device by at least a factor of 1.3, in particular by at least a factor of 1.4, and/or by at most a factor of 1.8, in particular by at most a factor of 1.7. In particular, exclusively the dimensions of the at least two front windows are decisive, and not of any guide devices etc. that may be present in addition.

For ground milling machines of the present type, in particular of the center-rotor type, it has proved to be particularly preferred if the front window device has exactly two front windows, both of which are adjustable or displaceable relative to each other and/or relative to the rest of the machine frame, in particular linearly displaceable relative to each other, especially along an adjustment axis running horizontally and transversely to the forward direction. It is further advantageous if the front window device comprises at least one front window arranged in a stationary position in the operating position of the driver's cab and/or at least two front windows arranged at least in part next to one another as seen in the forward direction of the ground milling machine, wherein in particular the middle front window in relation to the width of the machine is stationary in the operating position of the driver's cab.

With regard to the specific embodiment of the front window arrangement, there are numerous preferred further design options. For example, it can be provided that a sealing device is arranged between the at least two front windows, such as a rubber lip or similar extending in the vertical direction between the at least two front windows. Additionally or alternatively, the front window arrangement may comprise an adjustment path limiter, in particular in the form of an adjustment stop, with which the adjustment range of the at least two front windows relative to each other is limited. Further additionally or alternatively, it can be advantageous if a locking device, in particular one that acts continuously, is present, with which the at least one front window that can be adjusted relative to the machine frame and/or relative to the at least one other front window can be locked relative to the machine frame and/or relative to the at least one other front window.

The adjustability of the at least one front window is preferably achieved with the aid of a guide device, for example by means of a linear guide, in particular in the form of at least one or two guide rails, along which the at least one adjustable front window is displaceable and/or by means of a suspension guide, in particular running along the vertical upper edge of the at least two front windows, in particular arranged on a protection roof or on a supporting frame of a protection roof.

The driver's cab may comprise a protection roof, wherein the protection roof preferably has at least one protection roof element extendable out towards the side of the ground milling machine, wherein the protection roof element is preferably adjustable independently of the at least one adjustable front window. As already mentioned at the outset, it can be provided that the driver's cab is adjustable between the operating position and a transport position with a reduced vertical height relative to the machine frame as compared to the operating position. In this case, it is now advantageous if a safety device is provided which is designed in such a way that an adjustment into the transport position is only possible if the at least two front windows are in a defined fixed position or are at least positioned without overhanging a protection roof and/or the machine frame and/or within defined limits on both sides of the driver's cab.

It can also be provided that the driver's cab comprises at least one rear window, wherein the rear window can be adjustable relative to the machine frame, in particular independently of the at least two front windows.

The invention also extends additionally to ground milling machines in which the driver's cab has driver's cab enlargements ("driver's cab floor enlargement element") which can be extended out to the side of the ground milling machine in a manner known per se, in particular in a manner projecting beyond the outside of the machine frame, wherein it is then preferred if at least one of the two front windows and in particular all of the front windows of the front window arrangement can be adjusted relative to the machine frame independently of the cab enlargement(s).

Lastly, there can additionally be a lower body guard which is arranged in the forward direction of the ground milling machine approximately at the level of the front window arrangement and which, in particular together with the front window, is adjustable between a stowed position substantially free of protrusion relative to the rest of the ground milling machine and a deployed position protruding to the side of the rest of the ground milling machine, in particular in such a way that it adjoins the at least one front window downwards in the vertical extension of at least one of the two front windows and preferably extends downwards to the floor of the driver's cab. The lower body guard can protect an operator located in the driver's cab even better from, for example, wind when he is in a position outside the lateral outer wall of the machine frame in the driver's cab.

BRIEF DESCRIPTION OF THE DRAWINGS

The invention will be explained in more detail below with reference to the exemplary embodiments detailed in the figures, which show schematically:

FIG. 1 a side view of a ground milling machine of the type in question;

DETAILED DESCRIPTION

Figure 2A:
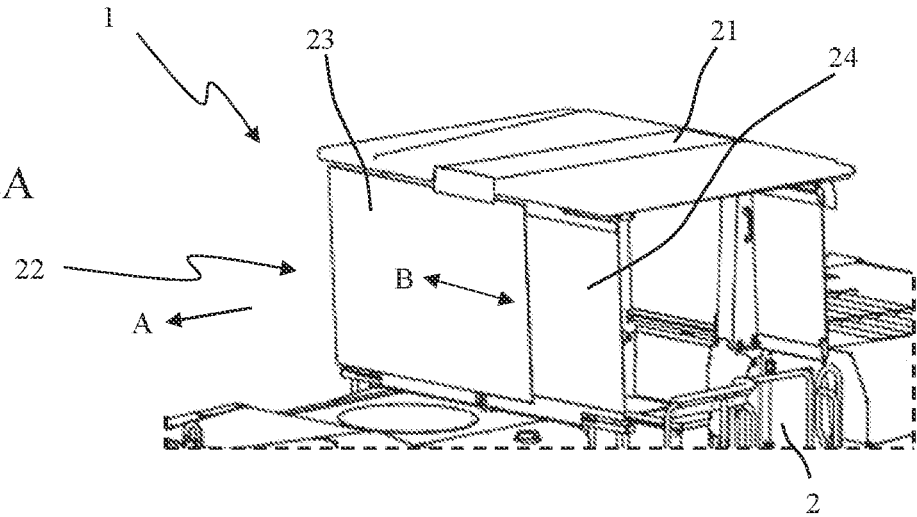
FIG. 2A a perspective oblique view of a driver's cab with a window arrangement in the position pushed together.

Like components are denoted in the figures with like reference signs, wherein not every component repeated in the figures is marked separately.

FIG. 1 shows a ground milling machine 1 of the type in question, specifically of the road milling type. The ground milling machine shown is a machine with a milling drum box arranged between the front and rear movement means 6 in the longitudinal direction or forward direction A, i.e. a so-called center-rotor machine. However, the invention is also applicable in particular to machines in which the milling drum box is positioned in the rear region of the machine. Essential elements of the ground milling machine are a driver's cab 2, from where an operator can control the ground milling machine, a machine frame 3, a drive motor 4, movement means 6 driven by the drive motor, specifically crawler tracks (although wheels can also be used), and a milling drum 9 (indicated by dashed lines) located in a milling drum box 7 and rotatable about a rotation axis 10 running horizontally and transversely to the working direction a, for milling up ground material of the ground surface 8. In working operation, the self-propelled ground milling machine 1 travels in the working direction a over the ground surface 8, dips with the milling drum 9 into the ground surface 8 with a milling depth and thereby mills up ground material in a manner known per se from the prior art. The milled-up ground material, i.e. the milled material, collects in the milling drum box 7 and is transported away during working operation by a conveying device 12 in a conveying direction F to a discharge point 15, preferably substantially continuously. From the discharge point 15, the milled material is then deposited on the ground surface, for example, or is loaded into a transport vehicle, in this case a vehicle travelling ahead.

The driver's cab 2 comprises a driver's cab floor 20, which is the standing surface for an operator located inside the driver's cab 2. The driver's cab 2 further comprises a protection roof 21, a front window arrangement 22 and preferably a rear window arrangement 33. The protection roof 21 together with the front window arrangement 22 and the rear window arrangement 23 can be lowered vertically downwards from the operating position shown in FIG. 1, for example for transport purposes. Further details, in particular regarding the structure of the front window arrangement 22, will become clear from the following figures.

Figure 2B:
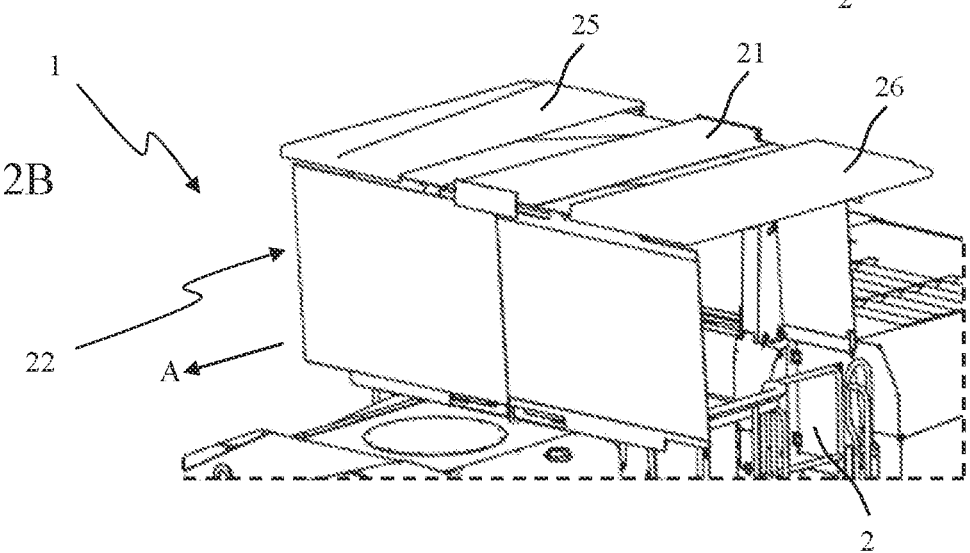
FIG. 2B the view from FIG. 2A with the protection roof elements extended out and the front windows pulled apart from one another.
Figure 2C:
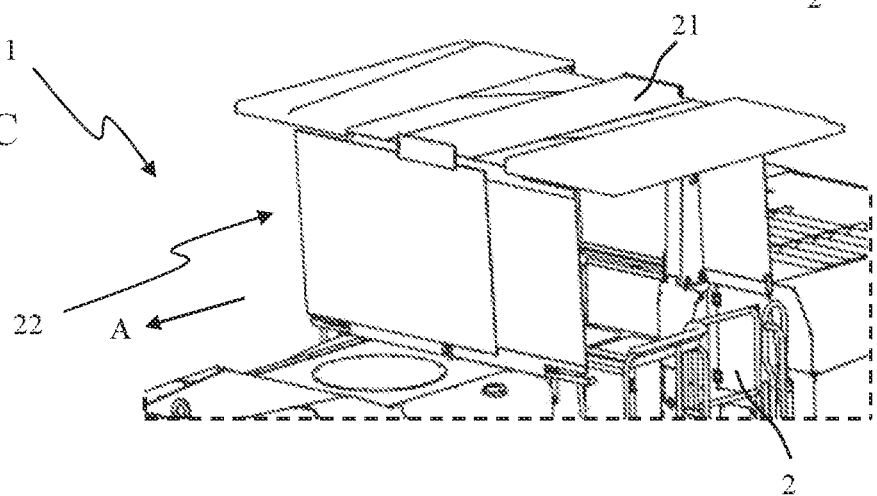
FIG. 2C the view from FIGS. 2A and 2B with the protection roof elements extended out and the front windows pushed together.

FIGS. 2A to 2C all relate to an exemplary embodiment. Firstly, it can be seen that the front window arrangement 22 comprises a first front window 23 and a second front window 24. Together, these form an overall front window surface through which the driver located in the driver's cab 2 can look in the forward direction A. The two front windows 23 and 24 can be substantially the same size, in particular of identical design. The two front windows 23 and 24 are adjustable relative to each other in the horizontal direction and transversely to the forward direction A in the arrow direction B. This means that the total width of the two front windows 23 and 24 together can be varied. This is illustrated by a comparison of FIG. 2A, in which the two front windows are in a position substantially in line with the width of the driver's cab floor, and the positioning in FIG. 2B, in which the two front windows are in a position projecting sideways beyond the driver's cab floor or at least beyond the machine frame part located in front of the driver's cab. The two front windows 23 and 24 have thus been moved in the opposite direction to each other in the arrow direction B in each case towards their outer side. In the center, they are still positioned as before, overlapping each other.

Furthermore, the protection roof 21 comprises protection roof elements 25 and 26 which can be extended out to the side. These are pushed in towards the longitudinal center of the machine in FIG. 2A and extended to the side in FIGS. 2B and 2C. FIGS. 2A to 2C show that the two front windows 23 and 24 can be adjusted independently of the protection roof elements 25 and 26. However, they can also be functionally coupled.

Figure 3A:
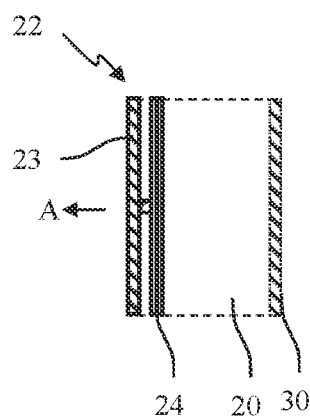
FIGS. 3A to 3C a plan view of a window arrangement with 2 front windows.
Figure 3B:
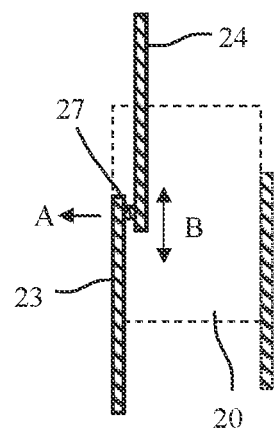
Figure 3C:
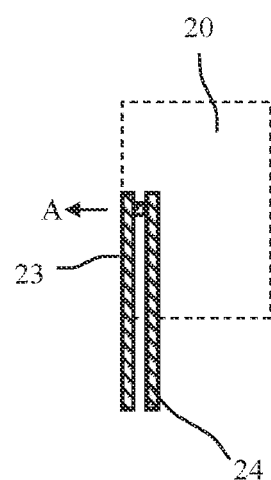

FIGS. 3A to 5B are plan views in the vertical direction from above the driver's cab in highly simplified representation and show different variants of the front window arrangement 22. FIGS. 3A to 3C show an exemplary embodiment of the window arrangement 22 with a total of exactly two front windows 24 and 23. In FIG. 3A, the two front windows 24 and 23 are arranged so as to completely overlap each other when viewed in the forward direction A. They are also centered with respect to the width of the driver's cab floor 20. In FIG. 3B the two front windows 24 and 23 are shown in their maximum laterally extended position. Viewed in the forward direction A, a strip 27 acting as a sealing device and adjustment stop is provided between the two front windows 24 and 23. This strip may be stationary in relation to the machine frame or to one or both of the windows. FIG. 3C illustrates that a possibility for adjustment can also be provided so that both front windows 22 and 23 can be displaced to the same side.

Figure 4A:
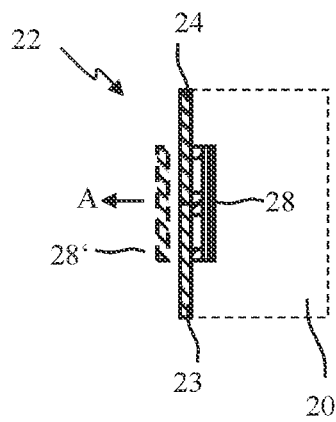
FIGS. 4A and 4B a plan view of a window arrangement with 3 front windows.
Figure 4B:
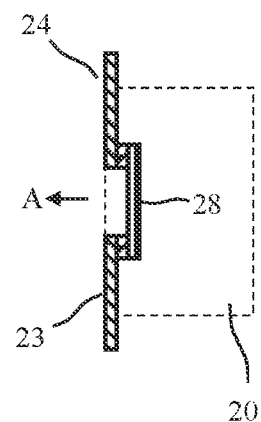

In the exemplary embodiment according to FIGS. 4A and 4B, a front window arrangement 22 comprising a total of three front windows 23, 24 and 28 is illustrated. The two front windows 23 and 24 are arranged next to each other as seen in forward direction A. The front window 28 can be arranged in front of the two front windows 23 and 24 as seen in the forward direction A. It is also possible to position the front window 28 behind the two front windows 23 and 24, as illustrated in FIG. 4A with the reference sign 28'. In principle, all of the three or more front windows can also be arranged one behind the other in the forward direction A. One of the front windows can be stationary relative to the driver's cab floor 20 (at least in the operating position of the driver's cab). This is the case for the front window 28 in FIG. 4B.

Figure 5:
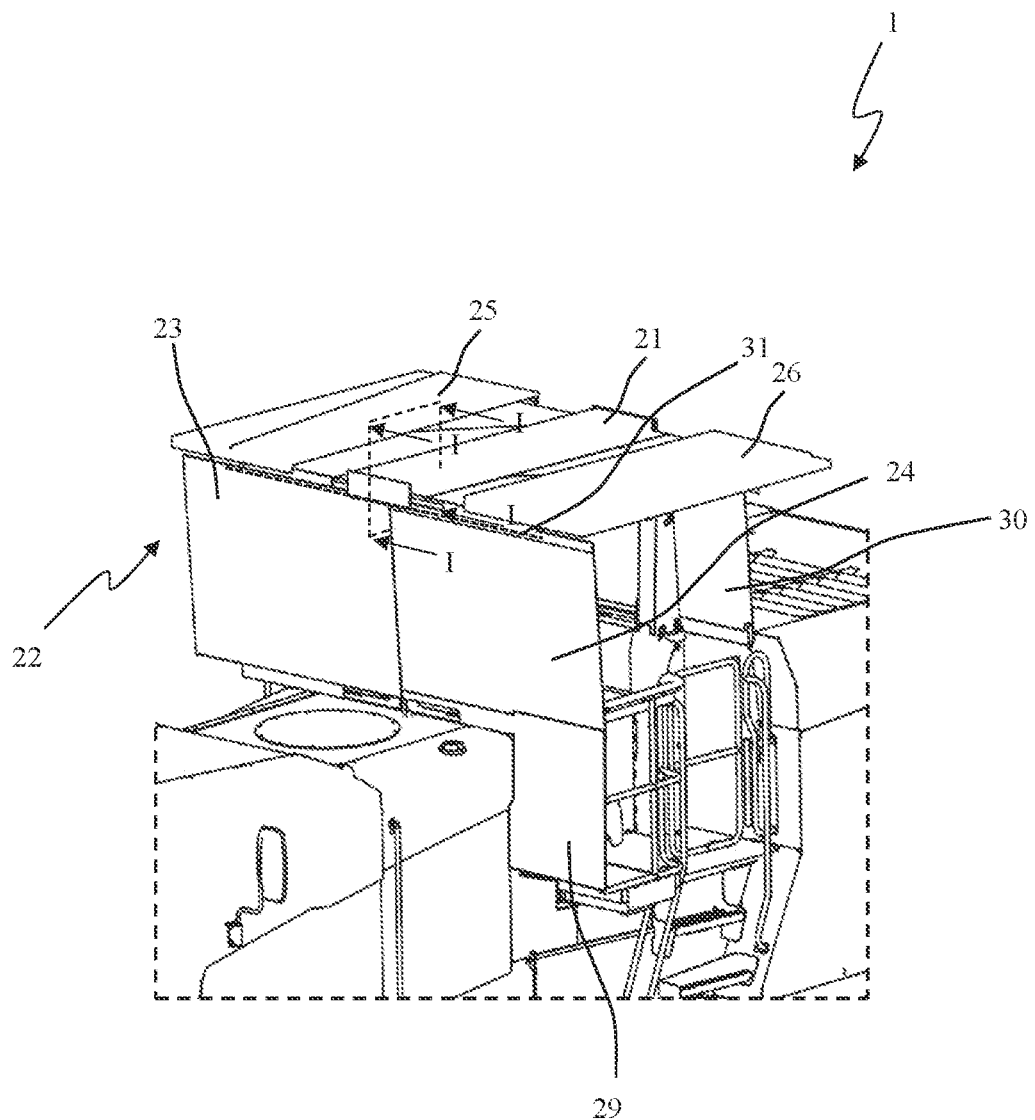
FIG. 5 an adjustment position corresponding to FIG. 2B with the lower body guard in the extended position.

Lastly, FIG. 5 corresponds substantially to the positioning of the individual elements according to FIG. 2B. In contrast to this, there is additionally provided a lower body guard 29, which, for example, adjoins the front window 24 vertically downwards. This guard can be adjustable together with or also independently of the front window 24. The guard is likewise preferably made of a transparent material, particularly preferably a break-proof plastic.

Figure 6A:
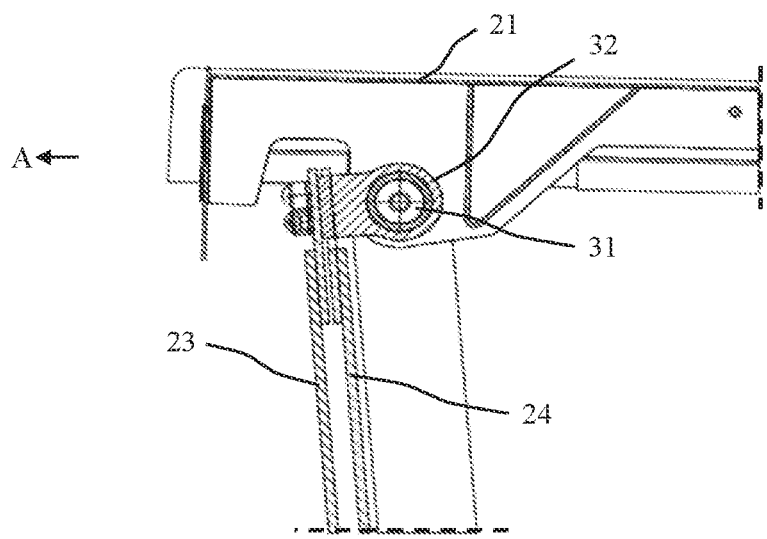
FIG. 6A an enlarged detail of the cross-sectional region I from FIG. 5 with the protection roof in the operating position or pivoted up.
Figure 6B:
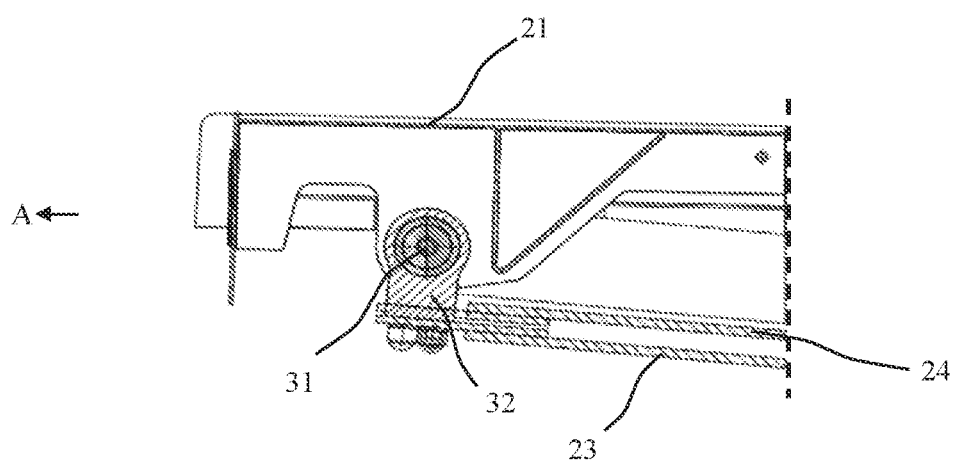
FIG. 6B an enlarged detail of the cross-sectional region I from FIG. 5 with the protection roof in the transport position or pivoted down.

Starting from the cross-section detail indicated by "I" in FIG. 5, FIGS. 6A and 6B illustrate another optional but preferred design feature. Essential here is a shaft 31 (position indicated by dashed lines in FIG. 5), which extends linearly and horizontally from the right to the left side and thus perpendicularly to the forward direction A. On the one hand, this shaft acts as a linear guide device. For this purpose, each of the two windows 23 and 24 is suspended via a bearing bush 32 on this shaft 31 in the upper region of the corresponding window 23/24 in the vertical direction and can thus be displaced along the longitudinal axis of the shaft 31. At the same time, however, the bearing bush 32 can also be rotated about the longitudinal axis of the shaft 31 since the shaft 31 has a circular cross-section in the present case. This allows the shaft 31 and the bearing bushing 32 to simultaneously cooperate together also as a pivot joint about which the windows 23/24 can be rotated between the operating position of the protection roof 21 according to FIG. 6A and the pivoted-down transport position of the protection roof 21 according to FIG. 7B. Other arrangements can also be used here, such as a separate pivot joint between the bearing bush 32 and the corresponding front window 23/24. Such an articulation of the window on the protection roof 21 can also be selected for one or more rear windows of the ground milling machine.

What is claimed is:

1. A ground milling machine comprising:
   a machine frame;
   a driver's cab;
   a drive motor;
   movement means driven by the drive motor; and
   a milling unit for milling up ground material;
   wherein the driver's cab has a protection roof and front window device through which an operator located in the driver's cab can look forward in a forward direction of the ground milling machine;
   wherein the front window device comprises at least two front windows which in an operating position of the driver's cab are adjustable relative to each other along a linear thrust axis, running horizontally and transversely to the forward direction of the ground milling machine and are arranged overlapping each other in the forward direction of the ground milling machine.

2. The ground milling machine according to claim 1, wherein the at least two front windows are arranged one behind the other in the forward direction of the ground milling machine.

3. The ground milling machine according to claim 1, wherein at least one of the at least two front windows has a width:
   which corresponds to a maximum width of the ground milling machine or is smaller than the maximum width of the ground milling machine; and/or
   which is at least 40% of the maximum width of the ground milling machine.

4. The ground milling machine according to claim 3, wherein the width of at least one of the at least two front windows is smaller than 90% of the maximum width of the ground milling machine.

5. The ground milling machine according to claim 4, wherein the width of at least one of the at least two front windows is smaller than 80% of the maximum width of the ground milling machine.

6. The ground milling machine according to claim 3, wherein the width of at least one of the at least two front windows is at least 50% of the maximum width of the ground milling machine.

7. The ground milling machine according to claim 6, wherein the width of at least one of the at least two front windows is at least 60% of the maximum width of the ground milling machine.

8. The ground milling machine according to claim 1, wherein the at least two front windows are adjustable relative to the rest of the driver's cab between a transport position and an extended position.

9. The ground milling machine according to claim 8, wherein a maximum width of the front window device in the extended position is greater than a minimum width of the front window device by at least a factor of 1.3 and/or by at most a factor of 1.8.

10. The ground milling machine according to claim 9, wherein a maximum width of the front window device in the extended position is greater than a minimum width of the front window device by at least a factor of 1.4 and/or by at most a factor of 1.7.

11. The ground milling machine according to claim 1, wherein the front window device has at least one of the following features:
    exactly two front windows, which are both adjustable relative to each other and/or relative to a rest of the machine frame, are linearly displaceable relative to each other;
    at least one front window arranged in a stationary manner in the operating position of the driver's cab;
    at least three front windows arranged at least partially next to one another, as seen in the forward direction of the ground milling machine, wherein the central front window in relation to the width of the machine is stationary in the operating position of the driver's cab.

12. The ground milling machine according to claim 1, wherein the front window arrangement has at least one of the following features:

a sealing device arranged between the at least two front windows;

an adjustment path limiter in a form of an adjustment stop, with which an adjustment range of the at least two front windows relative to each other is limited;

a locking device, by which at least one front window adjustable relative to the machine frame and/or relative to the at least one other front window is lockable relative to the machine frame and/or relative to the at least one other front window.

13. The ground milling machine according to claim 1, wherein the front window arrangement has at least one of the following features:

a linear guide in a form of at least one or two guide rails, along which at least one adjustable front window is displaceable;

a suspension guide running along the vertical upper edge of the at least two front windows on the protection roof or on a supporting frame of the protection roof.

14. The ground milling machine according to claim 1, wherein the driver's cab has at least one of the following features:

the driver's cab is adjustable between the operating position and a transport position with a reduced vertical height relative to the machine frame as compared to the operating position, wherein a safety device is provided which is configured such that an adjustment into the transport position is only possible when the at least two front windows are in a defined fixed position or are at least free of protrusion relative to the protection roof and/or the machine frame;

the driver's cab comprises at least one rear window, wherein the rear window is adjustable relative to the machine frame independently of the at least two front windows;

the driver's cab comprises driver's cab extensions which are extendable to a side of the ground milling machine in a manner projecting beyond an outside of the machine frame, wherein at least one of the two front windows is adjustable relative to the machine frame independently of the driver's cab extensions.

15. The ground milling machine according to claim 1, further comprising a lower body guard, which is arranged in the forward direction of the ground milling machine approximately at a level of the front window arrangement and which, together with the front window, is adjustable between a stowed position which is substantially free of protrusion relative to a rest of the ground milling machine and a raised position projecting to a side of the rest of the ground milling machine such that the lower body guard adjoins the at least one front window downwards in the vertical extension of at least one of the two front windows.

16. The ground milling machine according to claim 1, wherein the protection roof has at least one protection roof element which can be extended towards the side of the ground milling machine.

17. The ground milling machine according to claim 16, wherein the protection roof element is adjustable independently of the at least one adjustable front window.

* * * * *